United States Patent
Sheppard et al.

(10) Patent No.: US 12,271,925 B2
(45) Date of Patent: Apr. 8, 2025

(54) METHODS AND APPARATUS TO ESTIMATE POPULATION REACH FROM MARGINALS

(71) Applicant: The Nielsen Company (US), LLC, New York, NY (US)

(72) Inventors: Michael Sheppard, Holland, MI (US); Ludo Daemen, Duffel (BE); Damien Forthomme, Seattle, WA (US); Jake Dailey, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 75 days.

(21) Appl. No.: 17/961,514

(22) Filed: Oct. 6, 2022

(65) Prior Publication Data
US 2023/0042879 A1 Feb. 9, 2023

Related U.S. Application Data

(63) Continuation of application No. PCT/US2021/026010, filed on Apr. 6, 2021, which is
(Continued)

(51) Int. Cl.
*G06Q 30/02* (2023.01)
*G06Q 30/0241* (2023.01)
(Continued)

(52) U.S. Cl.
CPC ..... *G06Q 30/0246* (2013.01); *G06Q 30/0277* (2013.01); *H04N 21/812* (2013.01)

(58) Field of Classification Search
CPC ....... G06Q 30/0246; G06Q 30/0207–30/0277; H04N 21/812
See application file for complete search history.

(56) References Cited

U.S. PATENT DOCUMENTS

| 5,956,692 A | 9/1999 | Foley |
| 6,029,045 A | 2/2000 | Picco et al. |

(Continued)

FOREIGN PATENT DOCUMENTS

| WO | 2008127737 A1 | 10/2008 |
| WO | 2014210597 A1 | 12/2014 |
| WO | 2020190650 A1 | 9/2020 |

OTHER PUBLICATIONS

Esch et al., Appendix 8 Numerical Methods for Solving Nonlinear Equations, Asset and Risk Management: Risk Oriented Finance, published 2005 by John Wiley & Sons Ltd., 7 pages.
(Continued)

*Primary Examiner* — Thuy N Nguyen

(57) ABSTRACT

Methods, apparatus, systems, and articles of manufacture are disclosed to estimate population reach from marginals. An example apparatus includes memory including computer readable instructions; and a processor to execute the instructions to: iteratively converge on an output estimate of a pseudo universe estimate of a recorded audience of first media based on (A) a recorded reach for the recorded audience of the first media and (B) first marginal ratings for the recorded audience of the first media; determine a panel representation value based on the pseudo universe estimate of the recorded audience of the first media; and iteratively converge on an output estimate of a final reach of second media for a population audience based on the panel representation value and second marginal ratings for the population audience of the second media.

2 Claims, 6 Drawing Sheets

Related U.S. Application Data a continuation of application No. 16/843,650, filed on Apr. 8, 2020, now abandoned.

(51) Int. Cl.
  *G06Q 30/0242* (2023.01)
  *H04N 21/81* (2011.01)

(56) References Cited

U.S. PATENT DOCUMENTS

| | | | |
|---|---|---|---|
| 6,108,637 A | 8/2000 | Blumenau | |
| 6,460,025 B1 | 10/2002 | Fohn et al. | |
| 6,775,663 B1 | 8/2004 | Kim | |
| 7,197,472 B2 | 3/2007 | Conkwright et al. | |
| 7,746,272 B2 | 6/2010 | Vollath | |
| 7,865,916 B2 | 1/2011 | Beser et al. | |
| 7,954,120 B2 | 5/2011 | Roberts et al. | |
| 8,112,301 B2 | 2/2012 | Harvey et al. | |
| 8,149,162 B1 | 4/2012 | Pauls | |
| 8,171,032 B2 | 5/2012 | Herz | |
| 8,185,456 B2 | 5/2012 | LeClair et al. | |
| 8,200,693 B2 | 6/2012 | Steele et al. | |
| 8,214,518 B1* | 7/2012 | Bertz | H04L 65/70 709/219 |
| 8,327,396 B2 | 12/2012 | Ramaswamy | |
| 8,370,489 B2 | 2/2013 | Mazumdar et al. | |
| 8,423,406 B2 | 4/2013 | Briggs | |
| 8,453,173 B1* | 5/2013 | Anderson | H04N 21/254 706/45 |
| 8,619,892 B2 | 12/2013 | Vetter et al. | |
| 8,874,652 B1* | 10/2014 | Pecjak | G06Q 30/02 709/224 |
| 8,930,701 B2 | 1/2015 | Burbank et al. | |
| 8,973,023 B1 | 3/2015 | Rao et al. | |
| 9,094,710 B2 | 7/2015 | Lee et al. | |
| 9,111,186 B2 | 8/2015 | Blasinski et al. | |
| 9,224,094 B2 | 12/2015 | Oliver et al. | |
| 9,236,962 B2 | 1/2016 | Hawkins et al. | |
| 9,237,138 B2 | 1/2016 | Bosworth et al. | |
| 9,420,320 B2 | 8/2016 | Doe | |
| 9,529,836 B1 | 12/2016 | Hale | |
| 10,045,057 B2 | 8/2018 | Shah et al. | |
| 10,045,082 B2* | 8/2018 | Nagaraja Rao | H04N 21/44222 |
| 10,070,166 B2 | 9/2018 | Chaar et al. | |
| 10,313,752 B2 | 6/2019 | Nagaraja Rao et al. | |
| 10,380,633 B2 | 8/2019 | Morovati et al. | |
| 10,382,818 B2 | 8/2019 | Sheppard et al. | |
| 10,491,696 B2 | 11/2019 | Gierada | |
| 10,602,224 B2 | 3/2020 | Sullivan et al. | |
| 10,609,451 B2 | 3/2020 | De Andrade et al. | |
| 10,681,414 B2 | 6/2020 | Sheppard et al. | |
| 10,728,614 B2 | 7/2020 | Sheppard et al. | |
| 10,743,064 B2 | 8/2020 | Berezowski et al. | |
| 10,856,027 B2 | 12/2020 | Sheppard et al. | |
| 10,958,956 B2 | 3/2021 | Ricci | |
| 11,012,746 B2 | 5/2021 | Nagaraja Rao et al. | |
| 11,039,190 B1 | 6/2021 | Dailey et al. | |
| 11,115,710 B2 | 9/2021 | Sheppard et al. | |
| 11,140,449 B2 | 10/2021 | Sullivan et al. | |
| 11,216,834 B2 | 1/2022 | Sheppard et al. | |
| 11,323,772 B2 | 5/2022 | Sheppard et al. | |
| 11,425,458 B2 | 8/2022 | Sheppard et al. | |
| 11,438,662 B2 | 9/2022 | Sullivan et al. | |
| 11,481,802 B2 | 10/2022 | Sheppard et al. | |
| 11,483,606 B2 | 10/2022 | Sheppard et al. | |
| 11,523,177 B2 | 12/2022 | Sheppard et al. | |
| 11,553,226 B2 | 1/2023 | Sheppard et al. | |
| 2002/0123928 A1 | 9/2002 | Eldering et al. | |
| 2003/0037041 A1 | 2/2003 | Hertz | |
| 2004/0001538 A1* | 1/2004 | Garrett | H04L 25/03057 375/229 |
| 2004/0059549 A1 | 3/2004 | Kropaczek et al. | |
| 2006/0190318 A1 | 8/2006 | Downey et al. | |
| 2007/0087756 A1 | 4/2007 | Hoffberg | |
| 2008/0028006 A1 | 1/2008 | Liu et al. | |
| 2008/0228543 A1* | 9/2008 | Doe | G06Q 30/02 703/2 |
| 2008/0300965 A1 | 12/2008 | Doe | |
| 2008/0313017 A1 | 12/2008 | Totten | |
| 2010/0161385 A1 | 6/2010 | Karypis et al. | |
| 2010/0191723 A1 | 7/2010 | Perez et al. | |
| 2011/0015992 A1* | 1/2011 | Liffiton | G06Q 30/0247 705/14.46 |
| 2011/0196733 A1 | 8/2011 | Li et al. | |
| 2012/0023522 A1 | 1/2012 | Anderson et al. | |
| 2012/0052930 A1 | 3/2012 | McGucken | |
| 2012/0066410 A1 | 3/2012 | Stefanakis et al. | |
| 2012/0072940 A1 | 3/2012 | Fuhrer | |
| 2012/0110027 A1 | 5/2012 | Falcon | |
| 2012/0254911 A1 | 10/2012 | Doe | |
| 2012/0254922 A1 | 10/2012 | Rangarajan et al. | |
| 2013/0138743 A1 | 5/2013 | Amento et al. | |
| 2013/0198125 A1 | 8/2013 | Oliver et al. | |
| 2013/0254787 A1 | 9/2013 | Cox et al. | |
| 2013/0290233 A1 | 10/2013 | Ferren et al. | |
| 2013/0339991 A1 | 12/2013 | Ricci | |
| 2013/0346033 A1 | 12/2013 | Wang et al. | |
| 2014/0101685 A1 | 4/2014 | Kitts et al. | |
| 2014/0112557 A1 | 4/2014 | Santamaria-Pang et al. | |
| 2014/0278933 A1* | 9/2014 | McMillan | G06Q 30/0246 704/254 |
| 2014/0337104 A1 | 11/2014 | Splaine et al. | |
| 2014/0358676 A1* | 12/2014 | Srivastava | H04L 67/535 705/14.45 |
| 2015/0032310 A1 | 1/2015 | Zettel et al. | |
| 2015/0180989 A1 | 6/2015 | Seth | |
| 2015/0186403 A1* | 7/2015 | Srivastava | H04N 21/44226 707/692 |
| 2015/0189378 A1* | 7/2015 | Soundararajan | H04N 21/44222 725/12 |
| 2015/0193813 A1* | 7/2015 | Toupet | G06Q 30/0242 705/14.41 |
| 2016/0012314 A1 | 1/2016 | Ramamurthy et al. | |
| 2016/0027037 A1 | 1/2016 | Cai | |
| 2016/0086208 A1 | 3/2016 | Oliver et al. | |
| 2016/0134934 A1 | 5/2016 | Jared et al. | |
| 2016/0162955 A1 | 6/2016 | O'kelley et al. | |
| 2016/0232538 A1* | 8/2016 | Papakostas | H04L 67/02 |
| 2016/0232563 A1 | 8/2016 | Perez et al. | |
| 2016/0249098 A1 | 8/2016 | Pecjak et al. | |
| 2016/0269783 A1* | 9/2016 | Mowrer | H04N 21/42203 |
| 2016/0323616 A1 | 11/2016 | Doe | |
| 2016/0379246 A1 | 12/2016 | Sheppard et al. | |
| 2017/0006342 A1 | 1/2017 | Nagaraja Rao et al. | |
| 2017/0034594 A1* | 2/2017 | Francis | H04N 21/23424 |
| 2017/0053306 A1 | 2/2017 | Sissenich et al. | |
| 2017/0155956 A1 | 6/2017 | Nagaraja Rao et al. | |
| 2017/0187478 A1 | 6/2017 | Shah et al. | |
| 2017/0213243 A1 | 7/2017 | Dollard | |
| 2017/0300911 A1 | 10/2017 | Alnajem | |
| 2017/0372359 A1* | 12/2017 | Bodzo | G06Q 30/0201 |
| 2018/0073933 A1 | 3/2018 | Keskin et al. | |
| 2018/0189950 A1 | 7/2018 | Norouzi et al. | |
| 2018/0225709 A1 | 8/2018 | Ferber et al. | |
| 2018/0249208 A1 | 8/2018 | Sheppard et al. | |
| 2018/0249211 A1* | 8/2018 | Sheppard | G06Q 30/0201 |
| 2018/0249214 A1* | 8/2018 | Sullivan | H04N 21/6156 |
| 2018/0315060 A1 | 11/2018 | Sheppard et al. | |
| 2018/0376198 A1 | 12/2018 | Sheppard et al. | |
| 2019/0147461 A1 | 5/2019 | Sheppard et al. | |
| 2019/0354574 A1 | 11/2019 | Wick et al. | |
| 2019/0356950 A1 | 11/2019 | Sheppard et al. | |
| 2020/0120387 A1 | 4/2020 | Sheppard et al. | |
| 2020/0145720 A1 | 5/2020 | Krauss et al. | |
| 2020/0204863 A1 | 6/2020 | Sullivan et al. | |
| 2020/0294069 A1 | 9/2020 | Sheppard et al. | |
| 2020/0296441 A1 | 9/2020 | Sheppard et al. | |
| 2020/0359090 A1 | 11/2020 | Sheppard et al. | |
| 2020/0396502 A1* | 12/2020 | Watts | H04N 21/44204 |
| 2021/0014564 A1 | 1/2021 | Sheppard et al. | |
| 2021/0058659 A1 | 2/2021 | Sheppard et al. | |
| 2021/0065230 A1 | 3/2021 | Flynn | |

(56) References Cited

U.S. PATENT DOCUMENTS

| | | | |
|---|---|---|---|
| 2021/0084370 A1 | 3/2021 | Doe | |
| 2021/0133773 A1* | 5/2021 | Sheppard | G06Q 30/0273 |
| 2021/0158377 A1* | 5/2021 | Sheppard | H04H 60/66 |
| 2021/0248629 A1 | 8/2021 | Sullivan et al. | |
| 2021/0303552 A1 | 9/2021 | Pandey et al. | |
| 2021/0319002 A1 | 10/2021 | Ryan et al. | |
| 2021/0319474 A1 | 10/2021 | Sheppard et al. | |
| 2021/0400341 A1 | 12/2021 | Sheppard et al. | |
| 2022/0036390 A1 | 2/2022 | Sheppard et al. | |
| 2022/0038781 A1 | 2/2022 | Sullivan et al. | |
| 2022/0058667 A1 | 2/2022 | Sheppard et al. | |
| 2022/0058688 A1 | 2/2022 | Sheppard et al. | |
| 2022/0122104 A1 | 4/2022 | Sheppard et al. | |
| 2022/0159326 A1 | 5/2022 | Sheppard et al. | |
| 2022/0264179 A1 | 8/2022 | Sheppard et al. | |
| 2022/0264187 A1 | 8/2022 | Sheppard et al. | |
| 2022/0408154 A1 | 12/2022 | Sheppard et al. | |
| 2023/0070980 A1 | 3/2023 | Sullivan et al. | |
| 2023/0111617 A1 | 4/2023 | Sheppard et al. | |

OTHER PUBLICATIONS

International Searching Authority, International Search Report & Written issued Opinion, in connection with application No. PCT/US2021/026010, on Jul. 26, 2021, 8 pages.

International Searching Authority, International Search Report & Written Opinion, in connection with application No. PCT/US2020/022436 on Jul. 6, 2020, 7 pages.

International Searching Authority, International Search Report and Written Opinion, issued in connection with PCT Application No. PCT/US2022/015516, dated May 26, 2022, 7 pages.

International Searching Authority. International Search Report & Written Opinion, issued in connection with application No. PCT/US2020/022438 on Jul. 6, 2020, 8 pages.

United States Patent and Trademark Office Non-Final Rejection, issued in connection with U.S. Appl. No. 17/408,208, filed Aug. 15, 2022, 24 pages.

United States Patent and Trademark Office, Advisory Action, issued in connection with U.S. Appl. No. 16/657,652, on Aug. 19, 2021, 4 pages.

United States Patent and Trademark Office, Advisory Action, issued in connection with U.S. Appl. No. 16/676,158, mailed on Oct. 6, 2022, 3 pages.

United States Patent and Trademark Office, Advisory Action, issued in connection with U.S. Appl. No. 17/408,208, on Mar. 3, 2023, 2 pages.

United States Patent and Trademark Office, Final Office Action issued in connection with U.S. Appl. No. 15/445,543, on Aug. 3, 2018, 16 pages.

United States Patent and Trademark Office, Final Office Action issued in connection with U.S. Appl. No. 15/445,543, on Jul. 18, 2019, 12 pages.

United States Patent and Trademark Office, Final Office Action issued in connection with U.S. Appl. No. 15/619,257, on Jan. 18, 2019, 18 pages.

United States Patent and Trademark Office, Final Office Action issued in connection with U.S. Appl. No. 15/445,557, on Dec. 27, 2018, 9 pages.

United States Patent and Trademark Office, Final Office Action, issued in connection with U.S. Appl. No. 16/355,386, on May 4, 2021, 10 pages.

United States Patent and Trademark Office, Final Office Action, issued in connection with U.S. Appl. No. 16/526,747, on Dec. 30, 2020, 8 pages.

United States Patent and Trademark Office, Final Office Action, issued in connection with U.S. Appl. No. 16/657,652, on May 14, 2021, 19 pages.

United States Patent and Trademark Office, Final Office Action, issued in connection with U.S. Appl. No. 16/676,158, on Jul. 29, 2022, 30 pages.

United States Patent and Trademark Office, Final Office Action, issued in connection with U.S. Appl. No. 16/843,650, on Dec. 17, 2021, 33 pages.

United States Patent and Trademark Office, Final Office Action, issued in connection with U.S. Appl. No. 16/939,996, on Dec. 16, 2021, 19 pages.

United States Patent and Trademark Office, Final Office Action, issued in connection with U.S. Appl. No. 17/408,208, on Apr. 20, 2022, 26 pages.

United States Patent and Trademark Office, Final Office Action, issued in connection with U.S. Appl. No. 17/408,208, on Dec. 8, 2022, 10 pages.

United States Patent and Trademark Office, Non-Final Office Action issued in connection with U.S. Appl. No. 15/445,530, on Apr. 11, 2018, 9 pages.

United States Patent and Trademark Office, Non-Final Office action issued in connection with U.S. Appl. No. 15/635,153, on Feb. 5, 2018, 8 pages.

United States Patent and Trademark Office, Non-Final Office Action issued in connection with U.S. Appl. No. 16/676,158, mailed on Mar. 18, 2022, 29 pages.

United States Patent and Trademark Office, Non-Final Office action, issued in connection with U.S. Appl. No. 15/445,543, on Jan. 11, 2018, 19 pages.

United States Patent and Trademark Office, Non-Final Office Action, issued in connection with U.S. Appl. No. 15/445,543, on Jan. 8, 2019, 15 pages.

United States Patent and Trademark Office, Non-Final Office Action, issued in connection with U.S. Appl. No. 15/445,557, on Jun. 29, 2018, 11 pages.

United States Patent and Trademark Office, Non-Final Office Action, issued in connection with U.S. Appl. No. 15/619,257, on Jun. 15, 2018, 15 pages.

United States Patent and Trademark Office, Non-Final Office Action, issued in connection with U.S. Appl. No. 16/355,386, on Nov. 9, 2020, 8 pages.

United States Patent and Trademark Office, Non-Final Office Action, issued in connection with U.S. Appl. No. 16/526,747, on Jul. 23, 2020, 7 pages.

United States Patent and Trademark Office, Non-Final Office Action, issued in connection with U.S. Appl. No. 16/657,652, on Oct. 18, 2021, 22 pages.

United States Patent and Trademark Office, Non-Final Office Action, issued in connection with U.S. Appl. No. 16/657,652, on Oct. 27, 2020, 18 pages.

United States Patent and Trademark Office, "Non-Final Office Action," issued in connection with U.S. Appl. No. 17/008,263, on Oct. 8, 2021, 19 pages.

United States Patent and Trademark Office, Non-Final Office Action, issued in connection with U.S. Appl. No. 16/676,158, on Nov. 29, 2021, 24 pages.

United States Patent and Trademark Office, Non-Final Office Action, issued in connection with U.S. Appl. No. 16/843,650, on Dec. 2, 2022, 43 pages.

United States Patent and Trademark Office, Non-Final Office Action, issued in connection with U.S. Appl. No. 16/843,650, on Jul. 29, 2022, 36 pages.

United States Patent and Trademark Office, Non-Final Office Action, issued in connection with U.S. Appl. No. 16/843,650, on May 26, 2021, 26 pages.

United States Patent and Trademark Office, Non-Final Office Action, issued in connection with U.S. Appl. No. 16/893,129, on Apr. 13, 2021, 8 pages.

United States Patent and Trademark Office, Non-Final Office Action, issued in connection with U.S. Appl. No. 16/939,996, on Jun. 24, 2021, 15 pages.

United States Patent and Trademark Office, Non-Final Office Action, issued in connection with U.S. Appl. No. 17/093,460, on Oct. 22, 2021, 5 pages.

United States Patent and Trademark Office, Non-Final Office Action, issued in connection with U.S. Appl. No. 17/099,510, on Mar. 29, 2022, 6 pages.

(56) References Cited

OTHER PUBLICATIONS

United States Patent and Trademark Office, Non-Final Office Action, issued in connection with U.S. Appl. No. 17/408,208, on Jan. 5, 2022, 21 pages.
United States Patent and Trademark Office, Non-Final Office Action, issued in connection with U.S. Appl. No. 17/465,567, dated Nov. 16, 2022, 12 pages.
United States Patent and Trademark Office, Non-Final Office Action, issued in connection with U.S. Appl. No. 17/567,710, on Oct. 14, 2022, 8 pages.
United States Patent and Trademark Office, Non-Final Office Action, issued in connection with U.S. Appl. No. 17/666,359, on Aug. 18, 2022, 8 pages.
United States Patent and Trademark Office, Non-Final Office Action, issued in connection with U.S. Appl. No. 17/666,359, on Nov. 18, 2022, 9 pages.
United States Patent and Trademark Office, Non-Final Office Action, issued in connection with U.S. Appl. No. 17/734,792, on Oct. 13, 2022, 6 pages.
United States Patent and Trademark Office, Non-Final Office Action, issued in connection with U.S. Appl. No. 17/902,612, on Jan. 6, 2023, 5 pages.
United States Patent and Trademark Office, Non-Final Office Action, issued in connection with U.S. Appl. No. 17/408,164, dated Mar. 29, 2023, 14 pages.
United States Patent and Trademark Office, Non-Final Office Action, issued in connection with U.S. Appl. No. 17/408,208, dated May 10, 2023, 9 Pages.
Araujo et al., "Characterizing Videos, Audience and Advertising in Youtube Channels for Kids," arXiv:1707.00971v1 [cs.CY], Jul. 4, 2017, 11 pages.
Buzzard, "The Definition of the Audience in the History of Television Audience Research," University Microfilms International, 1985, 483 pages.
Bourguignon et al., On the Construction of Synthetic Panels, Oct. 2015, 42 pages.
Charles L. Byrne, Applied Iterative Methods, Jan. 23, 2007, 396 pages.
Charles L. Byrne, Iterative Algorithms in Inverse Problems, Apr. 25, 2006, 347 pages.
Golub et al., "Linear Least Squares and Quadratic Programming," Technical Report No. CS 134, Stanford University, Computer Science Department, May 1969, 38 pages.
Haggin et al., "Google Nears a Long-Tipped Limit on Tracking 'Cookies,' in Blow to Rivals," Wall Si Journal, May 6, 2019, obtained from https://www.wsj.com/articles/googles-newprivacy-tools-to-make-cookies-crumble-competitors-stumble-11557151913, 3 pages.
Huckett et al., "Combining Methods to Create Synthetic Microdata: Quantile Regression, Hot Deck, and Rank Swapping," Research Gate, Apr. 2008, 11 pages.
Marno Verbeek, Pseudo-Panels and Repeated Cross-Sections, The Econometrics of Panel Data, Springer-Verlag Berlin Heidelberg 2008, 15 pages.
P.J.G. Teunissen, Least-Squares Estimation of the Integer GPS Ambiguities, Delft University of Technology, Department of the Geodetic Engineering, Aug. 1993, 16 pages.
United States Patent and Trademark Office, "Final Office Action," issued in connection with U.S. Appl. No. 16/843,650, on Apr. 10, 2023, 40 pages.
United States Patent and Trademark Office, "Non-Final Office Action," issued in connection with U.S. Appl. No. 18/320,958, on Apr. 23, 2024, 7 pages.
United States Patent and Trademark Office, "Non-Final Office Action," issued in connection with U.S. Appl. No. 17/892,659, on Oct. 18, 2023, 26 pages.
United States Patent and Trademark Office, "Restriction Requirement ," issued in connection with U.S. Appl. No. 17/892,659, on Mar. 22, 2024, 6 pages.

\* cited by examiner

METHODS AND APPARATUS TO ESTIMATE POPULATION REACH FROM MARGINALS

RELATED APPLICATIONS

This patent arises from a continuation of International Patent Application No. PCT/US21/26010, filed on Apr. 6, 2021, which is a continuation of U.S. patent application Ser. No. 16/843,650, filed on Apr. 8, 2020. International Patent Application No. PCT/US21/26010 and U.S. patent application Ser. No. 16/843,650 are hereby incorporated herein by reference in their entireties. Priority to International Patent Application No. PCT/US21/26010 and U.S. patent application Ser. No. 16/843,650 is hereby claimed.

FIELD OF THE DISCLOSURE

This disclosure relates generally to media audience measurement, and, more particularly, to methods and apparatus to estimate population reach from marginals.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel). In some examples, the audience measurement entity obtains (e.g., directly, or indirectly from a media service provider) return path data from media presentation devices (e.g., set-top boxes) that identifies tuning data from the media presentation devices. In such examples, because the return path data may not be associated with a known panelist, the audience measurement entity models and/or assigns viewers to represent the return path data. In some examples, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

DETAILED DESCRIPTION

Figure 1:
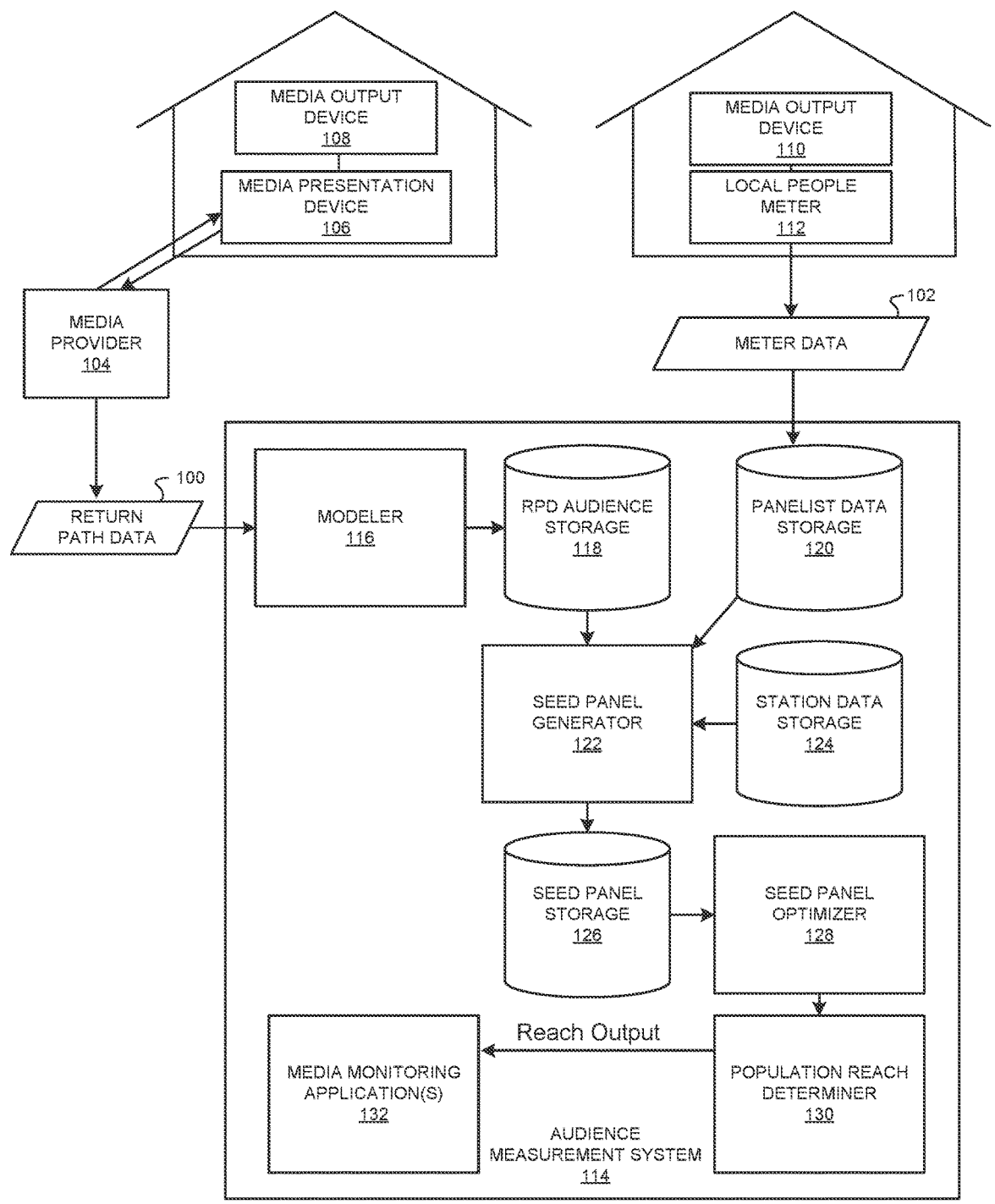
FIG. 1 is a block diagram of an example environment in which return path data and meter data are collected from media presentation locations and are analyzed by an example audience measurement system to estimate media reach for a population based on audience marginal ratings data.

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Also, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over the top service provider, a music service provider, a movie service provider, a streaming media provider, etc.) or purchased by a consumer may contain processing capabilities to monitor, store, and transmit tuning data (e.g., which television channels are tuned by the media presentation device at a particular time) back to the service provider, which can then aggregate and provide such return path data to an audience measurement entity (e.g., The Nielsen Company (US), LLC.) to analyze media presentation activity. Data transmitted from a media presentation device back to the service provider is referred to herein as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), which include metering device(s), such as a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation.

For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

In some examples, the audience measurement entity processes the collected and/or aggregated metering data for markets where a panel is maintained and obtains (e.g., from one or more service provider) return path data for markets where a panel is not maintained to generate a seed panel. A seed panel is a synthetic panel including monitored panelists and non-panelist selected to correspond to return path data homes (e.g., in-market return path data) and regional panel homes (e.g., over the air only panelists) and used as the basis for generation of synthetic respondent level data (e.g., representative of a group synthetic/virtual panelists) based on a similarity of the market that is not covered by return path data. These monitored panelists are selected from a panel (e.g., a national panel of metered users) based on a regional proximity to a designated market area, a similarity between demographics of the monitored panelists and demographics of the return path data audience location, household media characteristics (e.g., how the households receive television signals (cable, satellite, over-the-air radio, etc.)), a similarity between media consumption of the monitored panelists and the return path data audience, etc. As used herein, a return path data audience is represented by audience (e.g., viewer or listener) assigned return path data associated with a population (e.g., a universe or users) and/or location. As used herein, a seed panelist is a monitored panelist that has been selected to be included in a seed panel. As used herein, synthetic respondent level data or respondent level data is processed viewing data at the level of individual respondents. Synthetic respondent level data may include complete synthesized time records (e.g., at the quarter hour level, hour level, etc.) across each broadcasting day of all viewing session by individual family member and guest on individual metered media output devices in a home, and include the demographic data. As used herein, designated market area is a geographical area that defines a media market where synthetic respondent level data is produced.

In some examples, the audience measurement entity adjusts the seed panel to satisfy target ratings and/or target reach. As used herein, a rating is an average percentage of a population exposed to media across a given time interval. As used herein, reach is a cumulative percentage or total of a population that has been counted as a viewer of the media at least once during a given time interval (e.g., hourly, daily, weekly, monthly, etc.). Ratings and reach values may be determined for a same time interval or respective different time intervals. Examples disclosed herein adjust the seed panel by adjusting weights of seed panelists corresponding to the target rating and/or reach until the target rating and/or reach is satisfied. For example, if the target rating is 25% of men exposed to a first program during a first duration of time and 30% of the generated seed panel men were exposed to the first program during the first duration of time, the audience measurement entity may adjust the seed panel to reduce the current rating (e.g., 30%) for that demographic, to a rating closer to the target rating (e.g., 25%). The audience measurement entity may use the adjusted seed panel to generate media exposure data based on marginal data (e.g., quarter hours, hours, days, etc.). Such media exposure data may include a total number of seed panelists exposed to the media at the different margins, a total population of audience members exposed to the media at the different margins, a total number of deduplicated seed panelists exposed to the media (e.g., an audience reach) from all of the different marginal rating (e.g., probabilities), and a total population size (e.g., universe estimate) of users that potentially could be exposed to the media. As used herein, a marginal rating corresponds to a probability that a person in the universe of people was exposed to media for a particular duration of time. As used herein, a recorded audience refers to monitored panelists exposed to media and a population audience represent the total population of people (e.g., monitored panelists and other unmonitored media consumers associated with return path data) exposed to the media. Although examples disclosed herein are described in conjunction with marginal data from a seed panel, examples disclosed herein may be utilized to determine population data based on any type of recorded data.

Examples disclosed herein receive marginal media exposure data for different instances of media exposure (e.g., different episodes of a television series, different quarter hour time slots of a television program, or a radio program, etc.) and estimates a population reach across all of the different instances of media exposure based on the marginal media exposure data. Traditional techniques of determining the total population based on marginal media ratings include numerical calculations that enumerate the marginal rating data for all combinations in which someone can watch a program. The number of probabilities to be solved by such traditional techniques is $2^n$ number of probabilities, where n is the number of marginal probabilities provided in the marginal ratings data (e.g., the ratings for the different possible instances of media exposure). For example, if reach is to be calculated across 4 quarter hour intervals (e.g., for an hour-long media exposure), which corresponds to four possible marginal ratings, the total number of probabilities to be solved using such a traditional technique is 16 (e.g., $2^4$). If the reach is to be calculated across 96 quarter hour intervals (e.g., a day-long media exposure), the total number of probabilities to be solved using such a traditional technique is $8*10^{28}$ (e.g., $2^{96}$) thereby exceeding the memory limit and/or processing power of any existing computer. Examples disclosed herein alleviate such memory/processing resource problems associated with such a traditional technique by calculating the solution using a disclosed analytical process.

To estimate the total population reach, examples disclosed herein determine pseudo universe estimate(s) (e.g., a pseudo universe estimate of the monitored (also referred to as the recorded) audience and a pseudo universe estimate of the return path data (also referred to as the population) audience). A pseudo universe estimate corresponds to what the size of the universe of individuals capable of being in a given audience would need to be to achieve the ratings and reach values for that audience if the different marginal ratings are assumed to be independent, regardless of how much dependency actually exists among the different audience marginal ratings. For example, when the universe of a recorded audience is equal to the pseudo universe value, then the total reach of the recorded audience can be calculated from the audience marginal ratings assuming the audience marginal ratings are independent. However, if there is a difference between the pseudo universe of the recorded audience and the actual universe of the recorded audience, the audience marginal ratings are dependent. Examples disclosed herein (A) access marginal ratings for the recorded audience, marginal ratings for the population audience, reach for the recorded audience, and total population size (e.g., the actual universe estimate) and (B) determine pseudo universe estimates to solve a system of equations resulting in the population audience reach. The system of equations includes a link tool (e.g., a link equation), which is based on the pseudo universe estimates to link that dependency of the population audience marginal ratings to the dependencies exhibited by recorded audience marginal ratings. In this manner, examples disclosed herein determine the population audience reach from the marginal ratings, in a manner that takes into account the dependency among the different marginal ratings.

Examples disclosed herein use the below system of Equations (e.g., Equations 1a-3a), to determine the total population reach.

$$1 - \frac{A_d}{Q_R} = \prod_{i=1}^{N}\left(1 - \frac{A_i}{Q_R}\right) \quad \text{(Equation 1a)}$$

$$\frac{Q_R - A_d}{UE - A_d} = \frac{Q_P - X_d}{UE - X_d} \quad \text{(Equation 2a)}$$

$$1 - \frac{X_d}{Q_P} = \prod_{i=1}^{N}\left(1 - \frac{X_i}{Q_P}\right) \quad \text{(Equation 3a)}$$

In the preceding equations, UE is the actual universe estimate (e.g., the total population size), $A_d$ is the total recorded audience reach, $Q_R$ is the pseudo universe estimate of the recorded audience, N is the number of marginals, $A_i$ is the recorded audience marginal rating for the ith marginal, $X_d$ is the total population reach, $Q_P$ is the pseudo universe estimate of the population audience, and $X_i$ is the population marginal rating for the ith marginal. The pseudo universe estimates of the recorded audience and the population audience of Equations 1a and 3a represent the sizes of the respective recorded and population audiences would need to be for the respective marginal rating to yield to corresponding reach value if there was independence between the different marginal ratings. Equation 2a is the link between the independency assumption and the actual dependency exhibited by the recorded population. In the above Equations 1a-3a, Equation 1a defines the relationship between the recorded audience reach and the recorded audience marginal ratings assuming independence of the marginal ratings and the total population size is the pseudo universe for the recorded audience, Equation 3a defines relationship between the population audience reach and the population audience marginal ratings assuming independence of the marginal ratings and the total population size is the pseudo universe for the population audience, and Equation 2a is the link tool linking the independence associated with Equations 1a and 3a with the actual dependence of the marginal ratings.

Additionally or alternatively, Equations 1a-3a may be normalized across the UE, where each variable is a percentage of the actual universe estimate (UE), as shown in the below system of Equations (e.g., Equations 1b-3b).

$$1 - \frac{A_d}{Q_R} = \prod_{i=1}^{N}\left(1 - \frac{A_i}{Q_R}\right) \quad \text{(Equation 1b)}$$

$$\frac{Q_R - A_d}{1 - A_d} = \frac{Q_P - X_d}{1 - X_d} \quad \text{(Equation 2b)}$$

$$1 - \frac{X_d}{Q_P} = \prod_{i=1}^{N}\left(1 - \frac{X_i}{Q_P}\right) \quad \text{(Equation 3b)}$$

In some examples disclosed herein, the above system of equations may be solved using a root-finding algorithm which may require a nonlinear root finding system. Alternatively, the above system of equations may be adjusted to determine the total population reach without the need of a root-finding algorithm. For example, solving Equation 1a for $Q_R$ results in Equation 4.

$$Q_R = \frac{A_d}{1 - \prod_{i=1}^{N}\left(1 - \frac{A_i}{Q_R}\right)} \quad \text{(Equation 4)}$$

In Equation 4, $Q_R$ is a recursive function of itself, which can be solved iteratively for the subsequent pseudo estimate, as shown in Equation 5.

$$Q_R^{k+1} = \frac{A_d}{1 - \prod_{i=1}^{N}\left(1 - \frac{A_i}{Q_R^k}\right)} \quad \text{(Equation 5)}$$

At a given iteration, because $Q_R^k$ is known, examples disclosed herein can solve $Q_P^k$ using Equation 2a and rephrase Equation 3a to solve for $X_d$. Accordingly, Equations 1a-3a may be rephrased and solved iteratively using the Equations 6-8 below, thereby eliminating the need to using a root-finding algorithm.

$$Q_P^k = X_d^k + (UE - X_d^k)\left(\frac{Q_R^k - A_d}{UE - A_d}\right) \quad \text{(Equation 6)}$$

$$X_d^{k+1} = Q_P^k\left(1 - \prod_{i=1}^{N}\left(1 - \frac{X_i}{Q_P^k}\right)\right) \quad \text{(Equation 7)}$$

$$Q_R^{k+1} = \frac{A_d}{1 - \prod_{i=1}^{N}\left(1 - \frac{A_i}{Q_R^k}\right)} \quad \text{(Equation 8)}$$

In the preceding equations, Equation 6 defines the pseudo universe estimate of the population and is the link tool linking the independence assumption of Equations 7 and 8 with the actual dependencies exhibited by the marginal ratings, and Equation 8 defines the pseudo universe estimate of the recorded audience. In some examples, Equations 1b-3b may be rephrased resulting in a system of equations similar to Equations 6-8, but that is normalized across the UE. Examples disclosed herein let $Q_R$ be the solution to Equation 1a and define a panel representation value (r) using the below Equation 9.

$$r = \frac{Q_R - A_d}{1 - A_d} \quad \text{(Equation 9)}$$

Examples disclosed herein further define the system of equations to solve the censes using the below Equations 10 and the above Equation 3b.

$$r = \frac{Q_R - X_d}{1 - X_d} \quad \text{(Equation 10)}$$

In operation, examples disclosed herein initialize the pseudo universe estimate for the recorded audience as 1 (e.g., $Q_R^0=1$) and interactively solves the above Equation 8 until the value of $Q_R$ converges on a solution (e.g., the difference between the value of $Q_R$ at any iteration is less than a threshold distance from the value of $Q_R$ at a subsequent iteration). Once $Q_R$ is determined, examples disclosed herein determine the panel representation value using the above Equation 9. Examples disclosed herein store the panel representation value for use in the current and subsequent reach determinations, thereby eliminating the need to recalculate panel parameters for subsequent reach determinations. In this manner, processing and memory resources are conserved because the recalculation of the panel presentation value not needed. Although the panel representation value may be used for the same or different media (e.g., different episodes of the same show, episodes of different shows, and/or the same episode of the same show for a different audience (e.g., live vs. streaming)) from the same or different media providers, the panel representation value may be more accurate for similar types of media (e.g., media with similar audiences).

After the panel representation value is determined, examples disclosed herein initialize the pseudo universe estimate of the population audience (e.g., with $Q_P^0=1$) and the total population reach using the below Equation 11.

$$X_d^0 = 1 - \Pi_{i=1}^N (1 - X_i) \quad \text{(Equation 11)}$$

After the initialized values, examples disclosed herein iteratively solve the above Equation 7 and the below Equation 12 until the value of $X_d$ converges to a solution (e.g., the difference between the value of $X_d$ at any iteration is less than a threshold distance from the value of $X_d$ at a subsequent iteration) representative of the population reach (e.g., a de-duplicated total audience). The below Equation 12 corresponds to the above Equation 6 with the panel representation value (r) replacing $$\frac{Q_R - A_d}{1 - A_d}.$$

In this manner, $Q_R$ does not need to be recalculated for subsequent reach determinations (e.g., based on different marginal ratings (at the same time or a different time), different media providers, and/or different media), thereby conserving memory and processing resources.

$$Q_P^k = X_d^k + (1 - X_d^k) r \quad \text{(Equation 12)}$$

FIG. 1 is a block diagram of an environment in which example return path data 100 and example meter data 102 are collected to determine reach based on a marginal ratings data. FIG. 1 includes the example return path data 100, the example meter data 102, an example media provider 104, an example media presentation device 106, example media output devices 108, 110, an example local people meter (LPM) 112, and an example audience measurement system 114 managed by an example audience measurement entity (AME). The example audience measurement system 114 includes an example modeler 116, an example return path data (RPD) audience storage 118, an example panelist data storage 120, an example seed panel generator 122, an example station data storage 124, an example seed panel storage 126, an example seed panel optimizer 128, and an example population reach determiner 130.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc., based on the tuning of the example media presentation device 106. For example, the media presentation device 106 may be a set-top box. Additionally or alternatively, the example media presentation device 106 may be an over the top device, a video game console, a digital video recorder (DVR), a digital versatile disc (DVD) player, a receiver, a router, a server, a computer, a mobile device, and/or any device that receives media from a service provider. In some examples, the media presentation device 106 may implement a DVR and/or DVD player. In some examples, the example media presentation device 106 includes a unique device identifier (e.g., such as a unique serial number, a unique network address, etc.) that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement system 114. Additionally or alternatively, the audience measurement system 114 may be hosted by any other entity or may be co-hosted by another entity(ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement system 114 cooperating with the media provider to gain access to the tuning data. The example audience measurement system 114 includes the example return path data audience storage 118 (e.g., a database) and the example panelist data storage 120 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable to present media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In some examples, the LPM 112 may additionally or alternatively include at least one sensor (e.g., a camera, 3-dimensional sensor, etc.) and/or be communicatively coupled to at least one sensor that detects a presence of the user in a first example media presentation location. The example LPM 112 transmits the example meter data 102 to the audience measurement system 114. The example meter data 102 includes the media presentation data (e.g., data related to media presented while the media output device 110 is on and a user is present). Although the illustrated example illustrates the example audience measurement system 114 collecting the example meter data 102 from one LPM 112 at one location, the example audience measurement system 114 may collect meter data from any number or type of meters at any number of locations.

The example return path data 100 of FIG. 1 from the example media presentation device 106 and/or the example meter data 102 from the example LPM 112 is transmitted to the example audience measurement system 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet, a digital subscriber line (DSL), a telephone line, a coaxial cable, or any wireless connection, etc.

The example modeler 116 of the example audience measurement system 114 of FIG. 1 collects the example return path data 100 corresponding to the example media presentation device(s) 106. As described above, the example return path data 100 includes tuning data of the example media presentation device 106. However, the example return path data 100 may not include specific data identifying any information relating to the audience of the example media output device 108. The example modeler 116 models such audience information. For example, the modeler 116 may assign and/or model virtual users to augment the example return path data 100, thereby generating audience assigned return path data. The example modeler 116 outputs the audience assigned return path data to the example return path data audience storage 118.

The example seed panel generator 122 of FIG. 1 gathers (A) the audience assigned return path data from the example return path data audience storage 118, (B) the example meter data 102 from the example panelist data storage 120, (C) and station data from the example station data storage 124 to generate a seed panel. As explained above, a seed panel is a panel including synthetic respondent level data from a set monitored panelists corresponding to the LPM(s) 112 selected based on a return path data audience and/or homes. The seed panelists are selected to represent the return path data audience and/or homes. The example seed panel generator 122 assigns virtual geography and income data to the persons and/or homes corresponding to the audience assigned return path data and the meter data 102. The example seed panel generator 122 initializes the seed panel by selecting monitored panelists to be representative of the viewer/geography/income assigned return path data audience. For example, a monitored panelist may be selected based on a similarity between (A) the location of the monitored panelist and the location of a return path data audience member, (B) demographics corresponding to the location of the return path data audience member and the demographics of the monitored panelist, (C) media viewing characteristics of the return path data audience and the monitored panelist, etc. The example station data storage 124 stores data related to station receivability by location (e.g., such as by county, market area, etc.). The example seed panel generator 122 uses the station data to calculate the station receivability for over the air homes. In some examples, the seed panel generator 122 filters the seed panelists to collect attributes of interest at the person level and/or the household level. Attributes of interest at the person level may include age, gender, ethnicity, nationality, race, etc., and attributes at the household level may include head of household data, cable data, single set data, ADS data, county data, metro data, income, zip code, number of televisions, pay service data, etc. The example seed panel generator 122 weights the seed panelists according to the universe estimate(s) of the designated market area. The example seed panel generator 122 stores the final seed panel in the example seed panel storage 126. The final seed panel includes synthetic respondent level data associated with the seed panel.

The example seed panel optimizer 128 of FIG. 1 adjusts the seed panel generated by the example seed panel generator 122 to satisfy target ratings and/or target household ratings based on constraints. Such constraints may include audience constraints, including quarter hour constraints, daypart constraints, daily constraints, weekly constraints, monthly constraints, etc. Such constraints may also include reach constraints, including daypart reach constraints, daily reach constraints, weekly reach constraints, monthly reach constraints, etc. In some examples, the seed panel optimizer 128 applies a discrete optimization greedy search to adjust the panels to satisfy the target ratings and/or target household ratings based on the constraints. The example seed panel optimizer 128 transmits the adjusted seed panel data with corresponding synthetic level data (e.g., data related to the media corresponding to the target rating) to the example population reach determiner 130. The corresponding synthetic level data may include, for example, recorded audience marginal ratings of the media, population marginal ratings of the media, total reach of the recorded audience from marginal ratings, and a universe estimate. In some examples, parts of the synthetic level data may come from the adjusted seed panel and other parts may come from other data gathering devices and/or storage.

The example population reach determiner 130 of FIG. 1 receives the recorded audience marginal ratings (e.g., from the meter data 102) for different marginals (e.g., quarter hours, half hours, hours, days, etc.) of given media, the population marginal ratings (e.g., from the return path data 100) for the different marginals of the media, the total reach (e.g., from the meter data 102) for the recorded audience and a total population size (e.g., the actual universe estimate) from one or more devices. For example, the obtain data corresponding to (1) how many panelists viewed different quarter hours of a particular show on television (e.g., recorded audience marginal ratings for different marginals), (2) how many total users viewed different quarter hours of the particular show on television (e.g., the population marginal ratings for the different marginals of the media), the total number of deduplicated panelists that viewed the particular show across the different margins (e.g., the total reach for the recorded audience), and a number of users in a particular area (e.g., the total population size). Additionally or alternatively, the marginals may correspond to different websites, different webpages, different store visits, different programs, different stations, different media exposures, etc. In some examples, the example population reach determiner 130 determines a total population reach for the given media based on the received data. The example population reach determiner 130 determines the total population reach for the given media analytically using Equations 7, 8, 9, 11 and/or 12, thereby reducing memory and/or processing resources associated with the traditional numerical calculation. The example population reach determiner 130 outputs the reach output to another device and/or user and can reuse the panel representation value for subsequent reach determinations, thereby reducing memory and/or processing resources. The example population reach determiner 130 is further described in conjunction with FIG. 2.

In the illustrated example, the example audience measurement system 114 includes one or more media monitoring applications 132 to process the media identification information and match duration information output by the population reach determiner 130 to perform one or more operations based on that information. For example, the media monitoring application(s) 132 may include a media crediting application to credit media exposure at a media presentation environment to the reference media asset represented by the media identification information output by the population reach determiner 130. Additionally or alternatively, the media monitoring application(s) 132 may include one or more dynamic advertisement insertion applications to utilize the media identification information output by the population reach determiner 130 to select companion media, targeted commercials, etc., to provide to the media presentation devices 106 for presentation. Additionally or alternatively, the media monitoring application(s) 132 may include one or more secondary media selection insertion applications to utilize the media identification information output by the population reach determiner 130 to select secondary media to provide to secondary media devices (e.g., such as a smartphone and/or computer associated with one or more of panelist) for presentation in association with the monitored media being presented by the media presentation device 106. In some examples, the medio monitoring application(s) 132 is implemented in and/or as part of the population reach determiner 130.

Figure 2:
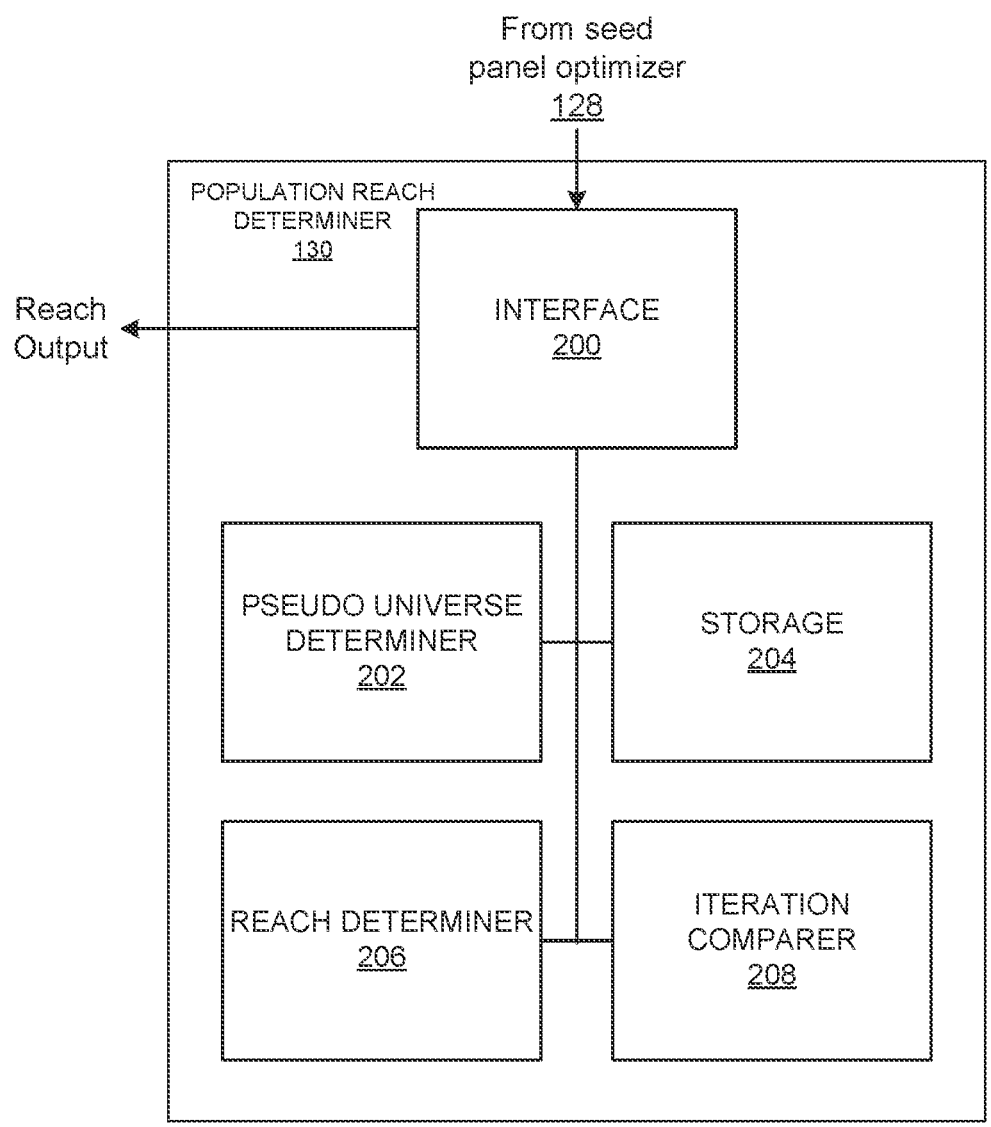
FIG. 2 is a block diagram of an example implementation of a population reach determiner included in the example audience measurement system of FIG. 1.

FIG. 2 is a block diagram of an example implementation of the example population reach determiner 130 of FIG. 1 to determine population reach for given media based on marginal ratings data. The example population reach determiner 130 of FIG. 2 includes an example interface 200, an example pseudo universe determiner 202, an example storage 204, an example reach determiner 206, and an example iteration comparer 208. Although the example population reach determiner 130 is described in conjunction with data generated by the example seed panel optimizer 128 of FIG. 1, the example population reach determiner 130 may determine reach based on information provided by any device that is capable of outputting audience marginal ratings, population marginal ratings, audience reach from the different marginal ratings, and universe estimates. For example, the example population reach determiner 130 may determine reach from marginal ratings for different programs, different stations different channels, different media, stores visits for different stores, different website visits, etc. The population reach determiner 130 may determine population reach based on any data that relates to a recorded audience to a population (e.g., panelist data, survey data, etc.), regardless if the recorded audience is included in the population.

The example interface 200 of FIG. 2 receives recorded audience marginal ratings corresponding to media for two or more margins (e.g., quarter hours), population audience marginal ratings corresponding to the media for the two or more margins, recorded audience reach from two or more marginal ratings, and a universe estimate of users. As described above, although the illustrated example of FIGS. 1 and 2 include the example seed panel optimizer 128 providing such data, the data may come from any device and/or may correspond to any type of data (e.g., website exposures, store entries, etc.) related to media exposure at different marginals. In the illustrated example, the marginals are broken up into quarter hours. For example, the recorded and/or population audience marginal ratings may correspond to four quarter hour marginals of an hour media program. However, the marginals may be broken up into any increments of time (hours, days, etc.). Additionally, the example interface 200 may output an estimated population reach (e.g., reach output) to another device/system and/or as a report to a user. In some examples, the interface 200 includes a panel representation value and/or a panelist correlation value (described below) with the transmission of the determined reach. In some examples, the example interface 200 may be two interfaces (e.g., a first interface to receive the datasets and a second interface to output the reach).

The example interface 200 of FIG. 2 is an example means for receiving (e.g., accessing, obtaining, etc.) recorded audience marginal ratings corresponding to media for two or more margins (e.g., quarter hours), population audience marginal ratings corresponding to the media for the two or more margins, recorded audience reach from two or more marginal ratings, and a universe estimate of users. Additionally, the interface 200 is an example means for outputting an estimated population reach (e.g., reach output).

The example pseudo universe determiner 202 of FIG. 2 generates and/or adjusts pseudo universe estimates as part of an iterative process to determine population reach. As described above, a pseudo universe corresponds to what the size of the universe of individuals capable of being in a given audience would need to be to achieve the ratings and reach values for that audience if the different marginal ratings are assumed to be independent, regardless of how much dependence actually exists. The example pseudo universe determiner 202 generates and/or adjusts recorded pseudo universe estimates and population pseudo universe estimates to increase the efficiency of the reach calculation. As further described below in conjunction with FIGS. 3-5, the example pseudo universe determiner 202 initializes the pseudo estimate and, in subsequent iterations, updates (e.g., adjusts) the initial pseudo estimate until the reach converges to an appropriate estimate.

After the example pseudo universe determiner 202 of FIG. 2 determines the recorded pseudo universe estimate via an iterative process, the example pseudo universe determiner 202 determines the panel representation value using the above Equation 9. As described above, the pseudo universe determiner 202 stores the panel representation value in the example storage 204 so that it can be used to determine the current reach and/or a subsequent reach for subsequent media without needing to recalculate the panel representative value, thereby eliminating the iterative process for subsequent reach determination to determine the panel representative value. The example pseudo universe determiner 202 may redetermine the panel representation value periodically, aperiodically, and/or based on changes to the panel or the total audience. In some examples, the pseudo universe determiner 202 may determine a panelist correlation value ($r^*$) based on panelist representation value. The pseudo universe determiner 202 may determine the panelist correlation value based on the below Equation 13.

$$r^* = \frac{1-r}{1+r} \qquad \text{(Equation 13)}$$

The panelist correlation value represents a deviation from independence of the datasets (e.g., the data from the panel and the data from the total audience). For example, $r^*$ being close to 1 represents a strong correlation, $r^*$ being close to 0 represents strong independence, and $r^*$ being close to $-1$ represents strongly disjoint data sets. As described above, the interface 200 may include the panel representation value and/or the panelist correlation value with the transmission of the reach determination.

The example pseudo universe determiner 202 of FIG. 2 is an example means for determining, generating, adjusting, and/or iteratively converging on pseudo universe estimates. Additionally, the example pseudo universe determiner 202 is an example means for determining, redetermining, calculating, recalculating, and/or storing the panel representation value and/or a panelist correlation value.

The example reach determiner 206 of FIG. 2 generates and/or adjusts reach estimates until the reach converges to an appropriate estimate. As described above, the reach is a deduplicated total audience corresponding to the total audience of given media who contributed to at least one of the different marginal ratings of the media. The example reach determiner 206 generates and/or adjusts total population reach to increase the efficiency of the reach calculation. As further described below in conjunction with FIGS. 3-5, the example reach determiner 206 initializes the reach to a particular value and, in subsequent iterations, updates (e.g., adjusted) the total audience reach until the reach converges to an appropriate estimate (e.g., within a margin of error). The example reach determiner 206 of FIG. 2 is an example means for determining, generating, adjusting, and/or iteratively converging on reach estimates.

The example iteration comparer 208 of FIG. 2 compares (A) a population audience reach determined during an iteration to a population audience reach determined during a subsequent iteration and/or (B) a pseudo universe of the recorded audience of determined during a previous iteration to a pseudo universe of the recorded audience determined during a subsequent iteration. In some examples, the iteration comparer 208 compares the reach and/or pseudo universe estimates by applying a mathematical difference. In such examples, the difference corresponds to an error of the estimate. The lower the difference, the lower the error and vice versa. The example iteration comparer 208 determines whether or not to continue performing iterations to further converge the population reach estimate, thereby increasing the accuracy of the estimated reach. For example, the iteration comparer 208 may continue to converge the population reach estimate until the error satisfies an error threshold. The error threshold may be based on user and/or manufacture preferences. The example iteration comparer 208 of FIG. 2 is an example means for comparing (e.g., by applying a mathematical difference) data across iterations. Additionally, the example iteration comparer 208 is an example means for determining whether or not to continue performing iterations based on an error determination.

While an example manner of implementing the example population reach determiner 130 of FIG. 1 is illustrated in FIG. 2, one or more of the elements, processes and/or devices illustrated in FIG. 2 may be combined, divided, re-arranged, omitted, eliminated and/or implemented in any other way. Further, the example interface 200, the example pseudo universe determiner 202, the example storage 204, the example reach determiner 206, the example iteration comparer 208, and/or, more generally, the example the example population reach determiner 130, of FIG. 2 may be implemented by hardware, software, firmware and/or any combination of hardware, software and/or firmware. Thus, for example, any of the example interface 200, the example pseudo universe determiner 202, the example storage 204, the example reach determiner 206, the example iteration comparer 208, and/or, more generally, the example the example population reach determiner 130, of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example pseudo universe determiner 202, the example storage 204, the example reach determiner 206, the example iteration comparer 208, and/or, more generally, the example the example population reach determiner 130 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example population reach determiner 130 of FIG. 2 may include one or more elements, processes and/or devices in addition to, or instead of, those illustrated in FIGS. 3-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
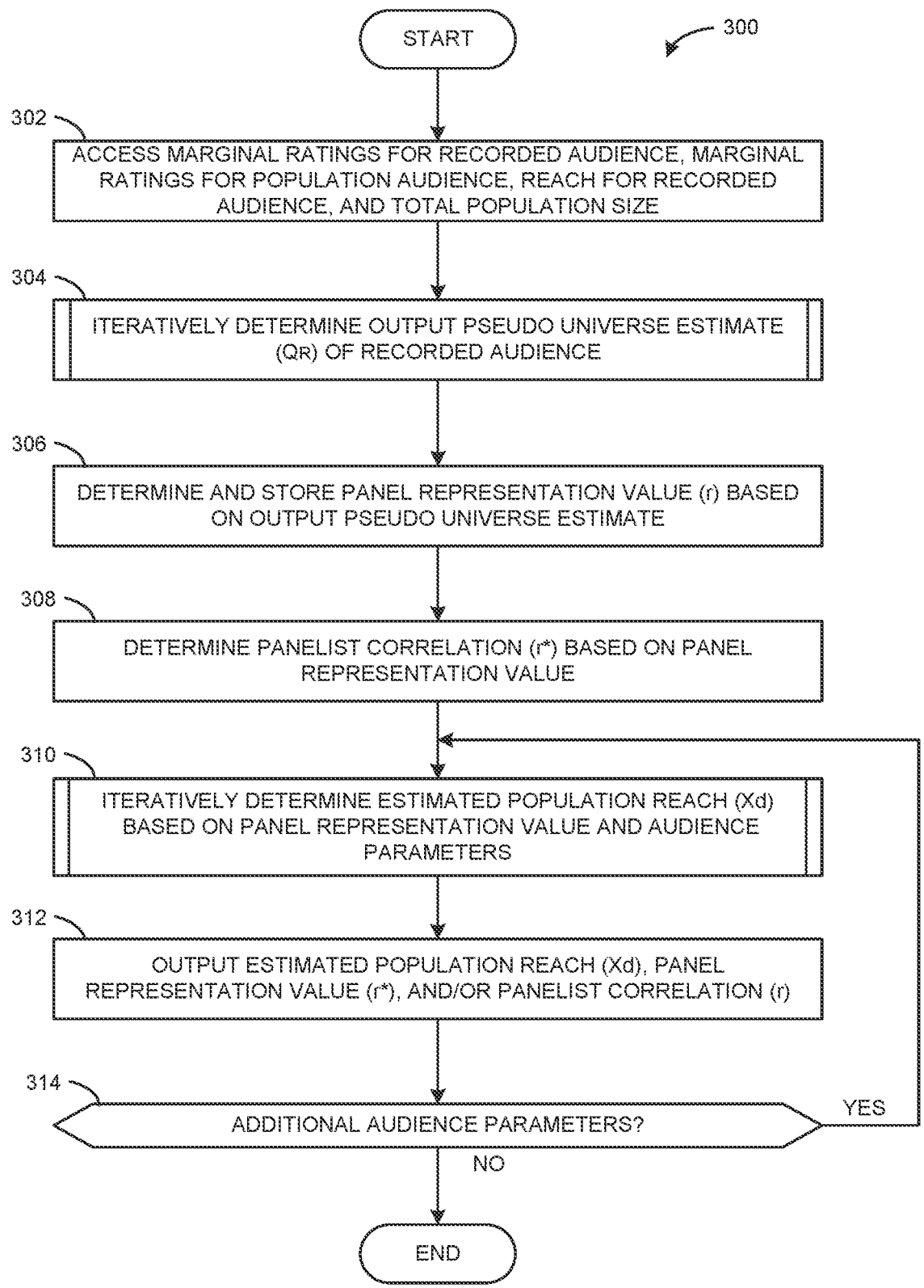
FIGS. 3-5 are flowcharts illustrating example machine readable instructions that may be executed to implement the example population reach determiner of FIGS. 1 and/or 2.
Figure 4:
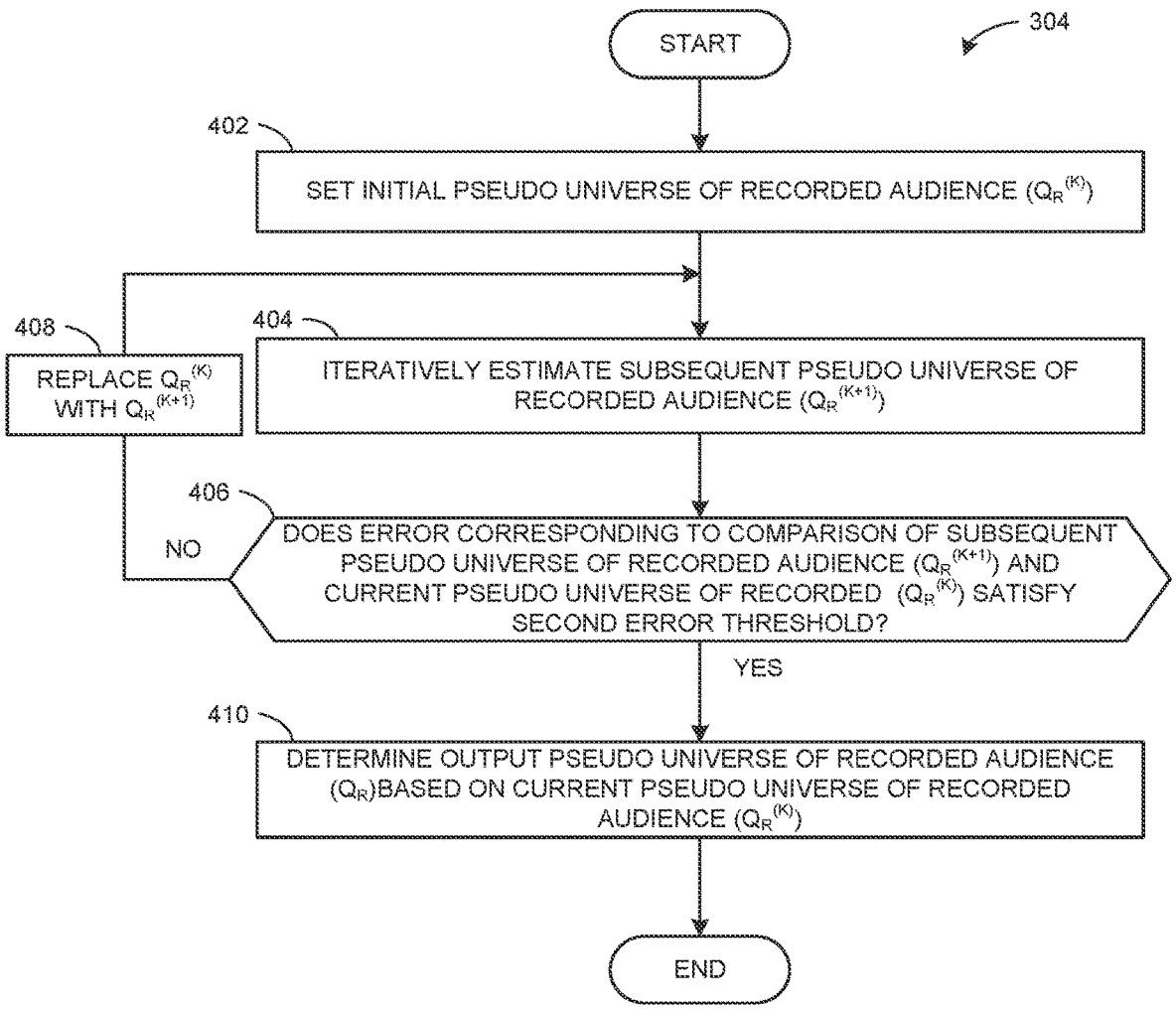
Figure 5:
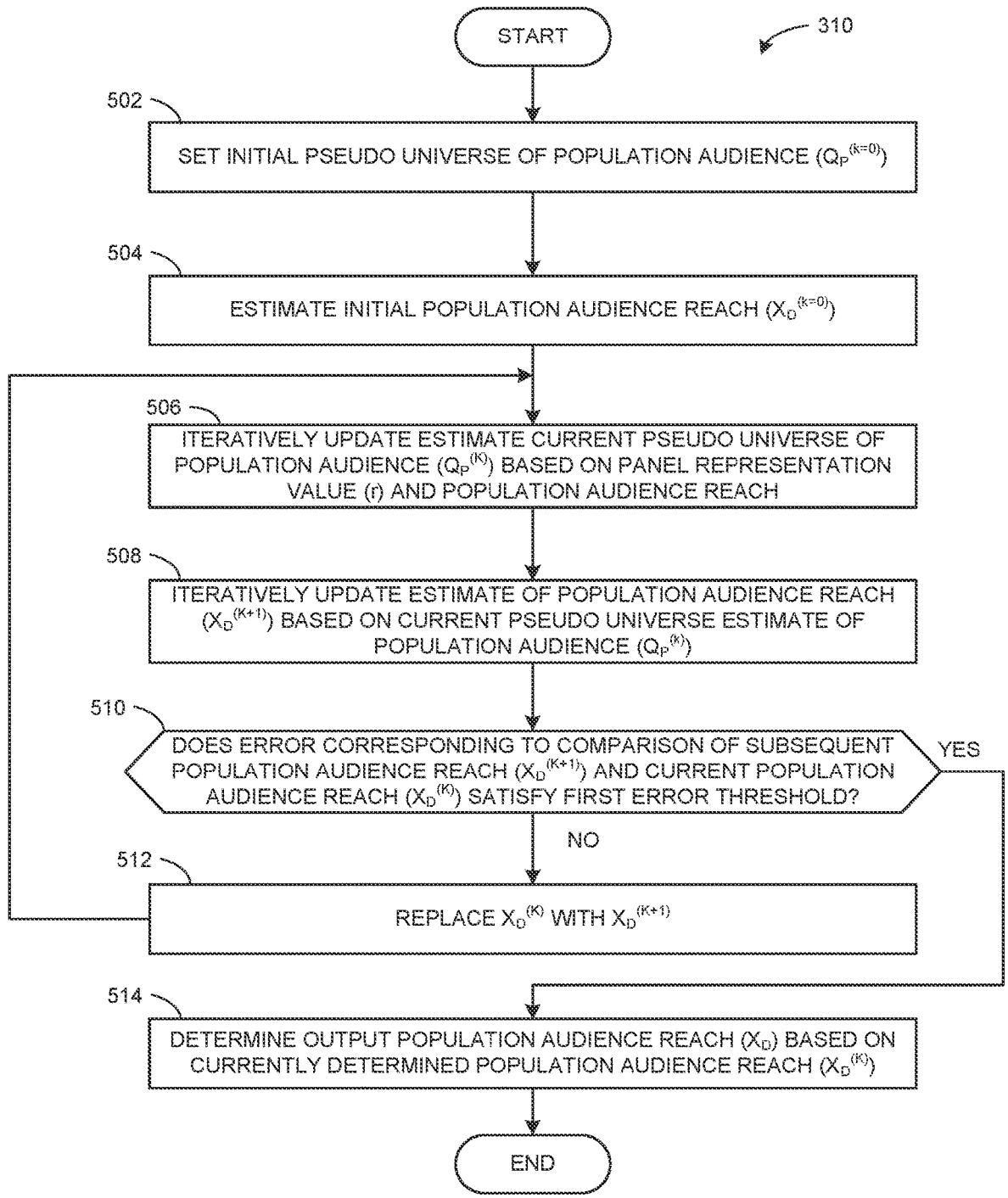

Flowchart representative of example hardware logic, machine readable instructions, hardware implemented state machines, and/or any combination thereof for implementing the example population reach determiner 130 of FIG. 2 are shown in FIGS. 3-5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example population reach determiner 130 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

While an example manner of implementing the example population reach determiner 130 of FIG. 1 is illustrated in FIG. 2, one or more elements, processes and/or devices illustrated in FIG. 2 may be combined, divided, re-arranged, omitted, eliminated and/or implemented in any other way. Further, the example interface 200, the example pseudo universe determiner 202, the example storage 204, the example reach determiner 206, the example iteration comparer 208, and/or, more generally, the example the example population reach determiner 130, of FIG. 2 may be implemented by hardware, machine readable instructions, software, firmware and/or any combination of hardware, machine readable instructions, software and/or firmware. Thus, for example, any of the example interface 200, the example pseudo universe determiner 202, the example storage 204, the example reach determiner 206, the example iteration comparer 208, and/or, more generally, the example the example population reach determiner 130, of FIG. 2 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example pseudo universe determiner 202, the example storage 204, the example reach determiner 206, the example iteration comparer 208, and/or, more generally, the example the example population reach determiner 130, of FIG. 2 is/are hereby expressly defined to include a tangible computer readable storage device or storage disk such as a memory, a digital versatile disk (DVD), a compact disk (CD), a Blu-ray disk, etc., storing the software and/or firmware. Further still, the example population reach determiner 130 of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example population reach determiner 130 of FIG. 2 are shown in FIGS. 3-5. In the examples, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-5, many other methods of implementing the example population reach determiner 130 of FIG. 2 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any period (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any period (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart representative of example machine readable instructions 300 that may be executed by the example population reach determiner 130 of FIGS. 1 and 2 to generate a total audience reach from different marginals (e.g., quarter hours). Although the instructions of FIG. 3 are described in conjunction with population reach estimation based on quarter hour marginals of media exposure performed by the example population reach determiner 130 of FIGS. 1 and 2, the example instructions may be utilized to determine reach based on any type of media and/or marginal from any type of rating data. Although the below calculations are based on percentages (e.g., where each total is a percentage of the universe estimate), the below calculations may be based on total audience numbers by slightly modifying the above Equations 1-13 (e.g., replacing totals with percentage of the UE and replacing UE with 1 or 100%).

At block 302, the example interface 200 accesses marginal ratings for the recorded audience (e.g., based on the meter data 102), marginal ratings for the population audience (e.g., based on the return path data 100), reach for the recorded audience from increments of time (e.g., based on the meter data 102), and a total population size (e.g. universe estimate). For example, the below example table (Table 1) includes marginal ratings of a recorded audience and corresponding reach of the recorded audience for a 1-hour program broken up into 4 quarter hour margins (e.g., represented as percentages of the UE), where the entries include percentages of people exposed to media relative to a total universe estimate represented by 100% (e.g., or 1). For example, 10% reflects 100 person out of the 1000 universal estimate.

TABLE 1

Example Data

| UE = 100% (e.g., corresponding to 1,000 persons) | Recorded audience (percent) | Population Audience (percent) |
|---|---|---|
| A | 6% | 7.5% |
| B | 8% | 7% |
| C | 4% | 6% |
| D | 5% | 5% |
| Total | 10% | Xd? |

In Table 1, UE is the universe estimate, A is the marginal for the first quarter hour, B is the marginal for the second quarter hour, C is the marginal for the third quarter house, D is the marginal for the fourth quarter hour, Total is the deduplicated total recorded audience corresponding to any of the marginals A, B, C, and D (e.g., the recorded reach), and Xd is the population reach, which is to be determined.

Alternatively, as explained above, A, B, C, and D may represent hours, days, stores, websites, etc.

At block 304, the example pseudo universe determiner 202 performs processing operations to iteratively determine the output pseudo universe estimate $(Q_R)$ of the recorded audience, as further described below in conjunction with FIG. 4. At block 306, the example pseudo universe determiner 202 determines the panel representation value based on the output pseudo universe estimate and stores the panel representation value in the example storage 204. For example, the pseudo universe determiner 202 determines the panel representation value using Equation 9. Using the information of the example of Table 1, if the total recorded audience reach Ad is 10% and the example pseudo universe determiner 202 determines $Q_R=0.103028$, the example pseudo universe determiner 202 determines that the panel representation value to be $$0.00336\left(r = \frac{0.103028 - 0.1}{1 - 0.1}\right).$$

At block 308, the example pseudo universe determiner 202 determines a panelist correlation based on the panel representation value, using Equation 13. For example, the pseudo universe determiner 202 determines the panelist correlation value to be $$0.993293 \left(\text{e.g., } r^* = \frac{1 - 0.00336}{1 + 0.00336}\right).$$

At block 310, the example population reach determiner 130 performs processing operations to iteratively determine an estimated (e.g., output) reach of the population audience based on the panel representation value and audience parameters (e.g., the marginal ratings for the population audience, the record for the recorded audience and/or the total population size). The iterative estimation performed at block 310 is further described below in conjunction with FIG. 5. At block 312, the example interface 200 outputs the estimated population reach, the panel representation value, and/or the panelist correlation. The example interface 200 may output the estimated population reach, the panel representation value, and/or the panelist correlation as a signal for further processing and/or as a report to a user (e.g., customer). At block 314, the example reach determiner 206 determines if there are additional audience parameters for reach determination (e.g., subsequently obtained population totals, data for a different total audience, data from different media, data from a different media provider, etc.). For example, the interface 200 may obtain second marginal data from a second population for second media corresponding to the below Table 2 different than the first marginal data from the first population for the first media from Table 1 (e.g., for a different show), from a second media provider different than the first media provider from Table 1 (e.g., if the data from Table 1 is from a first media provider and the data from the below Table 2 is from a second media provider), from a second total audience different from a first total audience (e.g., if the data from Table 1 is for a first audience at a first region and the data from the below Table 2 is for a second audience at a second region), etc., as shown below in Table 2.

TABLE 2

Example Data

| UE = 100% (e.g., corresponding to 1,000 persons) | Population Audience (percent) |
|---|---|
| A | 12% |
| B | 10% |
| C | 7% |
| D | 13% |
| Total | Xd? |

In such an example, control can return to block 310 and the population reach determiner 130 can determine a final output estimate population reach for the different at least one of media, media provider, marginals, etc., based on the marginal data from Table 2 and the panel representation value determined at block 306 without performing the iterative process of block 304, thereby conserving processor resources and time. For example, base on the iterative process of block 310 (further described below in conjunction with the instructions of FIG. 5) and the determined panel representative value (r) from block 306, the Xd of the above Table 2 converges to 16.9%.

If the example reach determiner 206 determines that additional audience parameters are available for an additional reach determination (block 314: YES), control returns to block 310 to estimate the reach for the additional audience parameters. For example, if there is a subsequent population data for the same media or different media (e.g., from the same or a different media provider) and/or a different number for the total audience, control would return to block 310 to perform the reach determination for the subsequent population data. As described above, for subsequent audience parameters, the reach can be determined using the panel representation value without re-determining the pseudo universe estimate for the recorded audience because the panel representation value (r) has been stored and can be used to determine the reach. If the example reach determiner 206 determines that additional audience parameters are not available (block 314: NO), the flowchart of FIG. 3 ends.

FIG. 4 is an example flowchart representative of example machine readable instructions 304 that may be executed by the example population reach determiner 130 of FIGS. 1 and 2 to perform processing operations to iteratively determine the pseudo universe estimate of the recorded audience, as described above in conjunction with block 304 of FIG. 3. Although the instructions of FIG. 4 are described in conjunction with a reach estimation based on quarter hour margins of media exposure from the example population reach determiner 130 of FIGS. 1 and 2, the example instructions may be utilized to determine reach based on any type of media and/or marginals from any type of ratings data. The example flowchart of FIG. 4 is described in conjunction with the above Table 1.

At block 402, the example pseudo universe determiner 202 sets the initial pseudo universe estimate of the recorded audience ($Q_R^k$) to be representative of the total population size (UE) (block 402). Using the example of Table 1, the example pseudo universe determiner 202 determines the initial pseudo universe estimate of recorded audience to be 1 or 100% (e.g., $Q_R^0=1$).

At block 404, the example pseudo universe determiner 202 iteratively updates the estimate of the pseudo universe of recorded audience ($Q_R^{k+1}$), as shown in Equation 8. Using the example of Table 1, the example pseudo universe determiner 202 determines the subsequent pseudo universe of recorded audience ($Q_R^1$) to be 0.473255

$$\left( e.g., \frac{0.1}{1 - \left(1 - \frac{0.06}{1}\right)\left(1 - \frac{0.08}{1}\right)\left(1 - \frac{0.04}{1}\right)\left(1 - \frac{0.05}{1}\right)} \right).$$

At block 406, the example iteration comparer 208 determines if an error corresponding to a comparison of the subsequent pseudo universe of recorded audience and current pseudo universe of recorded audience satisfies a second error threshold. For example, the iteration comparer 208 may calculate an error by computing the mathematical difference between the subsequent pseudo universe of the recorded audience and the current pseudo universe of the recorded audience. Using the example of Table 1, the iteration comparer 208 calculates the error to be 0.526745 (e.g., |0.473255-1|, because $Q_R^1=0.473255$ and $Q_R^0=1$). The first threshold error corresponds to the granularity of the population audience reach and may be set or adjusted based on user and/or manufacture preferences. In some examples, the second error threshold is the same as the first error threshold.

If the example iteration comparer 208 determines that the second error corresponding to the comparison of the subsequent pseudo universe of the recorded audience and the current pseudo universe of the recorded audience does not satisfy the second error threshold (block 406: NO), the example pseudo universe determiner 202 replaces the current pseudo universe of the recorded audience with the subsequent pseudo universe of the recorded audience (block 408) and the process returns to block 404 to perform a subsequent iteration until the error is reduced to satisfy the second error threshold. If the example iteration comparer 208 determines that the second error corresponding to the comparison of the subsequent pseudo universe of the recorded audience and the current pseudo universe of the recorded audience satisfies the second error threshold (block 406: YES), the example pseudo universe determiner 202 determines the output pseudo universe of the recorded audience ($Q_R$) based on the current pseudo universe of the recorded audience (block 410). For example, after performing the iterative process using the example data of Table 1, the example pseudo universe determiner 202 determines the pseudo universe of the recorded audience to be $Q_R=0.103028$. Additionally or alternatively, the example reach determiner 206 may determine the population audience reach based on the subsequent determined population reach.

FIG. 5 is an example flowchart representative of example machine readable instructions 310 that may be executed by the example population reach determiner 130 of FIGS. 1 and 2 to perform processing operations to iteratively estimate reach of the population audience, as described above in conjunction with block 310 of FIG. 3. Although the instructions of FIG. 5 are described in conjunction with a reach estimation based on quarter hour margins of media exposure from the example population reach determiner 130 of FIGS. 1 and 2, the example instructions may be utilized to determine reach based on any type of media and/or marginals from any type of ratings data. The example flowchart of FIG. 5 is described in conjunction with the above Table 1.

At block 502, the example pseudo universe determiner 202 sets the initial pseudo universe estimate of the recorded audience ($Q_R^{k=0}$) to correspond to the total population size (UE). Using the example of Table 1, the example pseudo universe determiner 202 determines the initial pseudo universe estimate of recorded audience to be 1 or 100% (e.g., $Q_R^0=1$).

At block 504, the example reach determiner 206 estimates an initial population audience reach)($X_d^{k=0}$) assuming independence among the marginal ratings for the population using Equation 11. For example, using Equation 11 and the above Table 1, the reach determiner 206 determines the initial population audience reach ($X_d^0$) to be 0.231797 (e.g., (1−(1−0.075)(1−0.07)(1−0.06)(1−0.05))).

At block 506, the example pseudo universe determiner 202 iteratively estimates the pseudo universe of population audience ($Q_P^k$) based on the panel representation value (r) and the population audience reach according to Equation 12 (block 510). Accordingly, using the example of Table 1 and Equation 12, the pseudo universe determiner 202 estimates the current pseudo universe population audience for the first processing iteration ($Q_P^1$) to be 0.234382 (e.g., 0.231797+ ((1−0.231797)(0.00336)).

At block 508, the example reach determiner 206 iteratively updates the estimate of the population audience reach ($X_d^{k+1}$) based on the current pseudo universe of the population audience and the marginal ratings for the population audience, as shown in Equation 7. Using the example of Table 1, the example reach determiner 206 determines the current population audience reach estimate for the first processing iteration ($X_d^1$) to be 0.1689957

$$\left(e.g., 0.234382\left(1-\left(1-\frac{0.075}{0.234382}\right)\left(1-\frac{0.07}{0.234382}\right)\left(1-\frac{0.06}{0.234382}\right)\left(1-\frac{0.05}{0.234382}\right)\right)\right).$$

Although the first subsequent population audience reach is the same as the current population audience reach for the first iteration, subsequent iterations will result in different population reaches.

At block 510, the example iteration comparer 208 determines if an error corresponding to a comparison of the subsequent population audience reach and the current population audience reach satisfies a first error threshold. For example, the iteration comparer 208 may calculate an error by computing the absolute value of the mathematical difference between the subsequent population audience reach and the current population audience. Using the example of Table 1, the iteration comparer 208 calculates the error to be 0.76820 (e.g., |0.231797-1.0|).

If the example iteration comparer 208 determines that the error corresponding to the comparison of the subsequent population audience reach and the current population audience reach does not satisfy the first error threshold (block 510: NO), the example reach determiner 206 replaces the value of the current population audience reach (e.g., $X_D^k$) with (e.g., sets the $X_D^k$ equal to) the value of the subsequent population audience reach (e.g., $X_D^{k+1}$) (block 512) and control returns to block 506 for a subsequent iteration (e.g., to update the pseudo universe of the population audience and the population audience reach estimate based on the updated population audience reach). Using the example of Table 1, the example pseudo universe determiner 202 replaces the value of 0.231797 with the value of 0.168957 (e.g., sets $X_D^k$ equal to 0.168957). Although the first subsequent population audience reach is the same as the current population audience reach for the first iteration, subsequent iterations will result in different population reaches. In this manner, the pseudo universe of the recorded audience and the population reach are updated for an additional iteration to decrease the error(s) corresponding to the previous iteration, thereby increasing the accuracy of the population reach estimate.

If the example iteration comparer 208 determines that the error corresponding to the comparison of the subsequent population audience reach and the current population audience reach does satisfy the first error threshold (block 510: YES), the example reach determiner 206 determines the output population audience reach based on the currently determined population audience reach (block 514). Additionally or alternatively, the example reach determiner 206 may determine the population audience reach based on the subsequent determined population reach.

Figure 6:
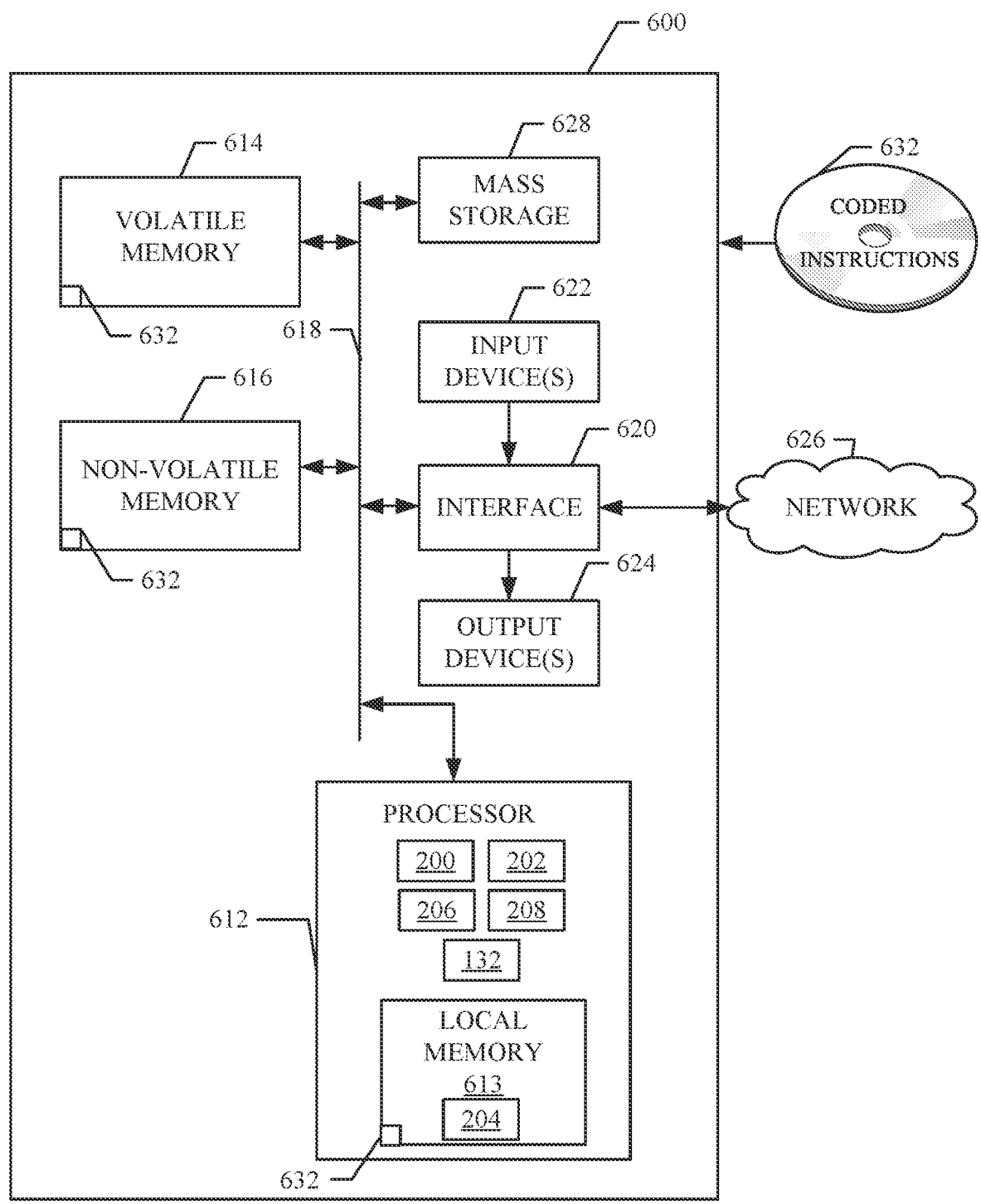
FIG. 6 is a block diagram of an example processor system structured to execute the example machine readable instructions of FIGS. 3-5 to implement the example population reach determiner of FIGS. 1 and/or 2.

FIG. 6 is a block diagram of an example processor platform 600 structured to execute the instructions of FIGS. 3-5 to implement the population reach determiner 130 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface 200, the example pseudo universe determiner 202, the example reach determiner 206, the example iteration comparer 208, and/or the example media monitoring application(s) 132.

The processor 612 of the illustrated example includes a local memory 613 (e.g., a cache). In this example, the local memory implements the example storage 204. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3-5 may be stored in the mass storage device 628, in the volatile memory 614, in the non-volatile memory 616, and/or on a removable non-transitory computer readable storage medium such as a CD or DVD.

From the foregoing, it should be appreciated that the above disclosed methods, apparatus, and articles of manufacture estimate population reach from marginals. Example disclosed herein determine the reach analytically using the above Equations 7-9 and 11-12. Traditional techniques for determining reach from different margins include determining the reach numerically. However, such traditional techniques are unsolvable for a large number of margins dues to memory and/or processing constraints. Examples disclosed herein alleviate the problems associated with such traditional techniques by demining the reach analytically (e.g., via solving the disclosed Equations). Using examples disclosed herein reach can be determined from a near infinity number of margins. The disclosed methods, apparatus and articles of manufacture are accordingly directed to one or more improvement(s) in the functioning of a computer.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The following claims are hereby incorporated into this Detailed Description by this reference, with each claim standing on its own as a separate embodiment of the present disclosure.

What is claimed is:

1. A computing system to determine reach of media from marginal rating measurements, the computing system comprising:
   a plurality of audience measurement meters configured to detect user exposure to media by capturing signals emitted externally by televisions, wherein the plurality of audience measurement meters comprise respective cameras to detect a presence of a user in respective media presentation locations; and
   an audience measurement system configured to perform a set of acts comprising:
      receiving, from the plurality of audience measurement meters via a network, meter data collectively indicative of a panel reach measurement for a television show at a first time and first panel marginal rating measurements for the television show at the first time,
      obtaining, from a media provider via the network, return path data indicative of first population marginal rating measurements for the television show at a first time and second population marginal rating measurements for the television show at the second time,
      performing a first plurality of process iterations to iteratively converge on a pseudo universe estimate for the television show at the first time based on the panel reach measurement for the television show at the first time, the first marginal rating measurements for the television show at the first time, and the first population marginal rating measurements for the television show at the first time,
      determining a panel representation value for the television show based on the pseudo universe estimate and the panel reach measurement,
      storing the panel representation value in a database for reuse in subsequent reach determinations,
      performing a second plurality of process iterations to iteratively converge on a reach estimate for the television show at a second time based on the panel representation value stored in the database and the second population marginal rating measurements for the television show at the second time, and
      outputting the reach estimate for the television show at the second time.

2. A method to determine reach of media from marginal rating measurements, the method comprising:
   detecting, by a plurality of audience measurement meters, user exposure to media by capturing signals emitted externally by televisions, wherein the plurality of audience measurement meters comprise respective cameras to detect a presence of a user in respective media presentation locations;
   receiving, by an audience measurement system, from the plurality of audience measurement meters via a network, meter data collectively indicative of a panel reach measurement for a television show at a first time and first panel marginal rating measurements for the television show at the first time;
   obtaining, by the audience measurement system from a media provider via the network, return path data indicative of first population marginal rating measurements for the television show at a first time and second population marginal rating measurements for the television show at the second time;
   performing, by the audience measurement system, a first plurality of process iterations to iteratively converge on a pseudo universe estimate for the television show at a first time based on the panel reach measurement for the television show at the first time, the first marginal rating measurements for the television show at the first time, and the first population marginal rating measurements for the television show at the first time;
   determining, by the audience measurement system, a panel representation value for the television show based on the pseudo universe estimate and the panel reach measurement;

storing, by the audience measurement system, the panel representation value in a database for reuse in subsequent reach determinations;

performing, by the audience measurement system, a second plurality of process iterations to iteratively converge on a reach estimate for television show at a second time based on the panel representation value stored in the database and the second population marginal rating measurements for the television show at the second time; and utputting the reach estimate for the television show at the second time.

\* \* \* \* \*